(No Model.)  2 Sheets—Sheet 1.

A. L. PURDY.
POTATO DIGGER.

No. 327,017.  Patented Sept. 29, 1885.

Witnesses,
Inventor,
Abbot L. Purdy (No Model.) 2 Sheets—Sheet 2.
A. L. PURDY.
POTATO DIGGER.
No. 327,017. Patented Sept. 29, 1885.
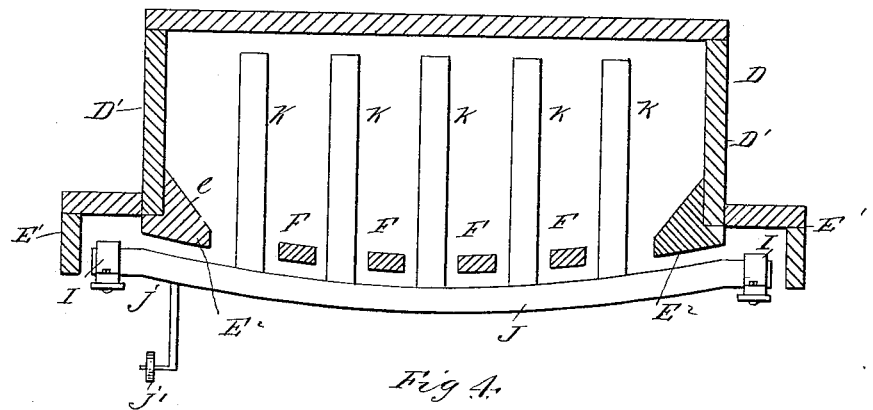
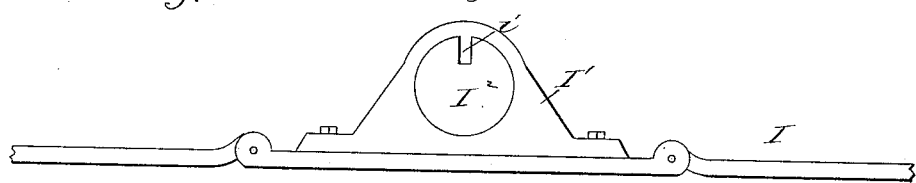
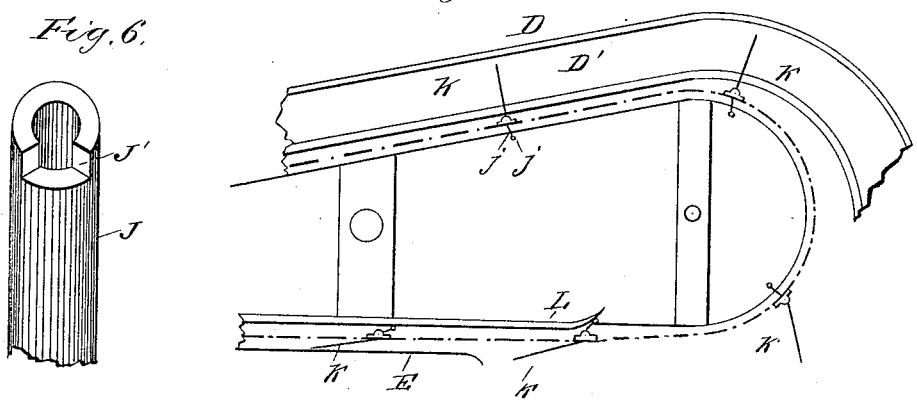
Witnesses.
Jno. R. Stuart
W. L. McKenna
Inventor:
Abbott L. Purdy
H. S. Sprague
attys

UNITED STATES PATENT OFFICE.

ALBERT L. PURDY, OF ALLENTOWN, NEW YORK.

POTATO-DIGGER.

SPECIFICATION forming part of Letters Patent No. 327,017, dated September 29, 1885.

Application filed September 16, 1884. (No model.)

*To all whom it may concern:*

Be it known that I, ALBERT L. PURDY, a citizen of the United States, residing at Allentown, in the county of Allegany and State of New York, have invented certain new and useful Improvements in Potato-Diggers, of which the following is a specification, reference being had therein to the accompanying drawings.

My invention has relation to that class of potato-diggers in which a scoop or shovel is used for loosening the soil and potatoes, and more particularly to that class in which a series of parallel bars are used with said scoop for the purpose of cleaning the potatoes while being elevated.

The object of the invention is a machine for digging and elevating the potatoes; and it consists in the device and mechanism, more fully described and claimed hereinafter, whereby the potatoes are dug from the ground, elevated, and screened while being elevated.

Figure 1:
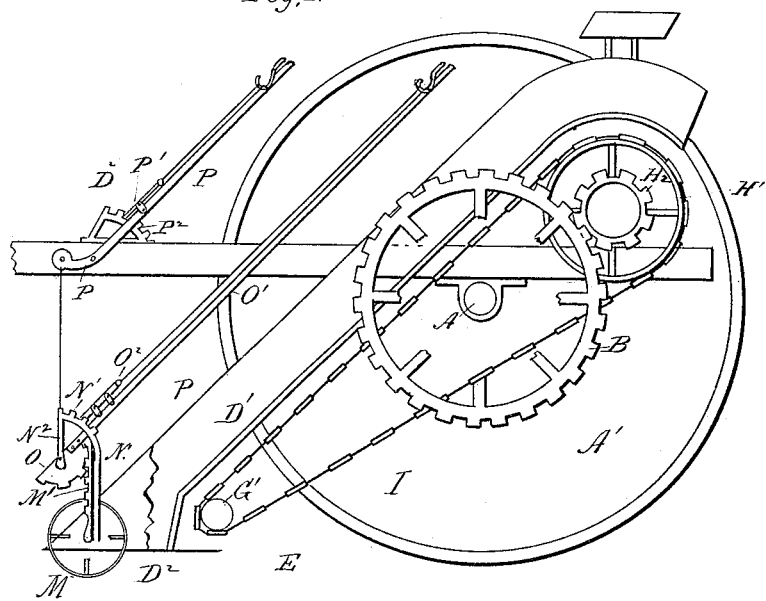
Figure 2:
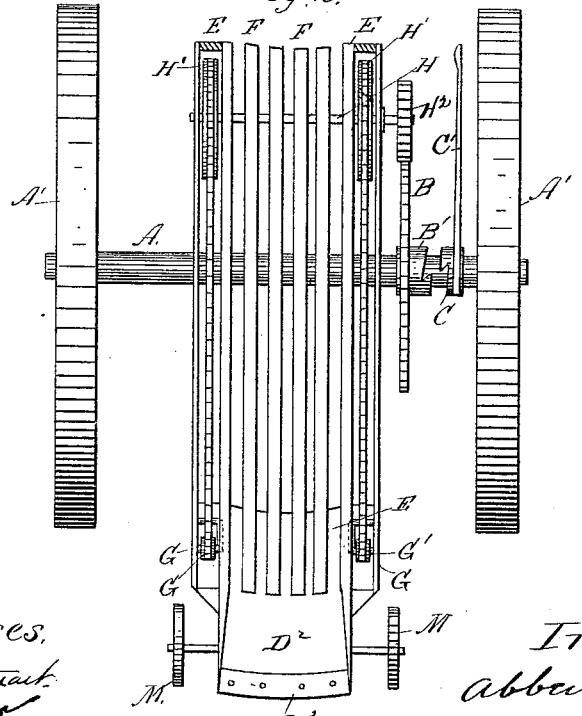

In the accompanying drawings, Figure 1 is a vertical section, and Fig. 2 a plan view with the elevator-casing broken away, of my machine. Fig. 3 is a detached cross-sectional view of the elevator. Fig. 4 is a detail view of the elevator-chain. Fig. 5 is a detail view of a portion of the elevator, and Fig. 6 shows the fork-shaft.

The axle A has the wheels A' A' on its opposite ends, and they may be keyed or clutched thereon, as desired.

The gear-wheel B is sleeved on the axle and has a clutch portion, B', which is suitably arranged to be engaged by the sliding clutch C, which is keyed on and movable along the axle, and may be moved into or out of engagement with part B' by means of lever or handle C'. The elevator frame or casing D has its side plates, D', journaled near their upper ends on the axle A. The lower end or base-plate, D², of the casing extends forward in approximately a horizontal plane, and is provided, by preference, with a steel point or nose, D³. A plate, E, is carried rearwardly from plate D². The object of the plate is to receive and guide the forks after they have been tripped, as will be hereinafter explained.

The sides D' are formed with slight offsets E', extending laterally outward from their opposite sides, in which are secured and operate the endless chains carrying the fork-shafts. Cleats E² are secured and extended on the lower outer edges of plates D', and have their faces e beveled inward, so that the dirt and potatoes will fall onto the slats and be properly subjected to the screening action of the slats and forks. The slats F may be of any suitable number, and are secured at their lower forward ends on the base-plate D², and extend upward for a short distance almost vertically. They are carried thence rearwardly parallel with cleats E² to the rear of the axle A and above same, where they are curved slightly downward for the purpose of more conveniently delivering the screened potatoes by the forks of the endless carrier, and are then united with the cleats E² in the form of an apron, giving them their support. The pulleys G' are supported by shafts G. Shafts G are short shafts journaled in lower end of elevator-casing, and supported from frame above lower wing of chain, as shown in Fig. 2. The shaft H is provided with sprocket-wheels H' H' in line with pulleys G', and adapted to drive the chains of the endless carrier.

I extend one end of the shaft H beyond the casing and secure on it a pinion, H², which is geared with and receives motion from the wheel B. This pinion drives the shaft H and sprockets H', which in turn drive the endless carrier through its chains, as shown. Either chains or belts may be used; but I prefer the chains, because thereby I get in connection with sprocket drive-wheels a more positively stronger operation than can be had in a slow-moving machine by belt and smooth pulley. The endless carrier consists of the chains, the forks, and their shafts. The chains I are provided at intervals with link-blocks I', formed with bearings I² for the fork-shafts, and have projected into said bearings from their upper side pins or studs $i$.

The fork-shafts J have their ends journaled in bearings I', and are provided in the upper or outer sides of said journaled ends with mortises or notches J', into which project the studs $i$. These mortises J' are made sufficiently wide to allow the partial turning of the shaft in the tilting thereof, presently described, while the studs $i$ prevent its free revolution, as will be understood from Figs. 3, 4, and 6. The forks K extend radially from shafts J, and project up between and above the slats, so that they will catch the dirt and potatoes and convey them up in the operation of the machine. The shaft is provided on one end with an inwardly-projected arm or extension, $j$, having on its extremity a roller, $j'$. This roller or end engages a trip, L, which is secured to one side of the casing above the lower wing of the carrier, and extends to and beyond the end of plate E, and preferably almost to the shaft G.

It will be noticed that in the operation of the machine, when the arm $j$ strikes trip L, the fork is thrown into the position shown in Fig. 5, and is carried over plate E point forward, and then projected into the dirt and under the potatoes on the base-plate. The forks are permitted to take this position by the partial rotation of the shaft by reason of the construction shown in Figs. 4 and 6.

By carrying the forks end foremost into the dirt they are more readily inserted and take a better hold on the mingled potatoes and dirt.

When the carrier rounds the pulleys G' the forks assume their usual almost perpendicular position and carry the dirt and potatoes up over the slats, screening the dirt therethrough, and deliver the cleaned potatoes over the rear end of the machine, where a bag or basket may be arranged to receive them; or they may be delivered onto the ground and gathered by pickers following the machine.

The elevator-frame, being journaled on the axle, may be turned and adjusted thereon as desired. The lower end of the elevator is supported on rollers M, which are preferably journaled in the lower ends of rack-bars M', which are lapped alongside of and movable along vertical bars N, to which they are held by keepers or loops. The bars N are curved forward at their upper end, and have teeth N' formed on them and bars N² depending in suitable position to support the segment O, which is toothed and meshed with rack M'. To these segments O are secured levers O', which extend into convenient reach of the driver, and has a detent, O², arranged to engage teeth N', so that the segment-rack M' and wheels M may be held in any position to which they may be adjusted. Thus it will be seen I am able to adjust the depth of the point of the base or shovel of the elevator-frame to run deep or shallow, as desired. While I prefer to so support the wheels M that they may be adjusted, it is obvious they could be supported in a fixed axle, as shown in Fig. 2.

When in transit from point to point, turning, and other times, it is sometimes desirable to elevate the point of the frame clear of the ground. To do this I provide a lever, P, pivoted to the draft-frame and connected at one end with the front of the frame D. By means of a suitable pawl, P', engaging a rack, P², the lever may be held in any proper position.

The driver's seat may be supported on the elevator-frame, as shown, or directly on the draft-frame.

By my machine the potatoes are dug from the ground, elevated, and separated from the dirt. The mechanism is simple in construction and operation, and easy of operation in the manner described.

It will be noticed that the slats form a perforated or screening plate for the potatoes and dirt. It is obvious that a plate perforated by a series of small openings could be employed instead of the slats, in which case the endless carrier would operate above the screen. I prefer, however, the slats, as shown, and before described.

I claim—

1. In a potato-digger, an elevator having a base-plate or shovel and slats fixed thereupon and extending vertically upward for a short distance, and carried thence upward and back at an incline, the endless carrier, the forks, and device whereby said forks are tilted and carried point forward along and over the base-plate, substantially as set forth.

2. The combination, with the plates D² and E, of the endless carrier having forks K and extensions $j$, and the trip L, said trip lying in front of plate E, and serving to receive the extension $j$ and turn the forks K so as to cause them to enter plate E, as shown and described.

3. In an endless carrier for potato-diggers, the combination of the belt having link-blocks provided with bearings I², and with studs $i$ projected thereunto, and the fork-shaft supported in said bearings and having its ends mortised at J' in proper position to receive the studs $i$, substantially as and for the purpose specified.

4. In a potato-digger, the combination of the slats, the base-plate D², the plate E, extended to the rear and upwardly from the plate D², the trip-bar L, and the endless carrier having its fork-shaft provided with an arm, $j$, arranged and adapted to engage the trip L, whereby the forks are tilted and carried point forward above the plate E, substantially as set forth.

In testimony whereof I affix my signature in presence of two witnesses.

ALBERT L. PURDY.

Witnesses:
JOHN C. DACHLER,
FRANK E. OSBORN.